United States Patent
Contreras

(10) Patent No.: US 10,936,696 B2
(45) Date of Patent: Mar. 2, 2021

(54) PASSIVE DNS SYSTEM

(71) Applicant: Chronicle LLC, Mountain View, CA (US)

(72) Inventor: Emiliano Martinez Contreras, Marbella (ES)

(73) Assignee: Chronicle LLC, Mountain View, CA (US)

( * ) Notice: Subject to any disclaimer, the term of this patent is extended or adjusted under 35 U.S.C. 154(b) by 235 days.

(21) Appl. No.: 16/024,127

(22) Filed: Jun. 29, 2018

(65) Prior Publication Data

US 2019/0012322 A1    Jan. 10, 2019

(30) Foreign Application Priority Data

Jul. 4, 2017   (EP) .................................... 17382431

(51) Int. Cl.
| | | |
|---|---|---|
| G06F 16/17 | (2019.01) | |
| G06F 16/958 | (2019.01) | |
| G06F 17/30 | (2006.01) | |
| H04L 29/12 | (2006.01) | |
| G06F 16/951 | (2019.01) | |
| G06F 16/22 | (2019.01) | |

(52) U.S. Cl.
CPC ........ *G06F 16/958* (2019.01); *G06F 16/2228* (2019.01); *G06F 16/951* (2019.01); *G06F 17/3089* (2013.01); *G06F 17/30321* (2013.01); *G06F 17/30864* (2013.01); *H04L 61/1511* (2013.01)

(58) Field of Classification Search
CPC ............... H04L 61/1511; G06F 21/566; G06F 16/24578; G06F 16/285; G06F 16/951; G06F 16/2228; G06F 16/9024; G06F 16/958
USPC ........................................................ 707/741
See application file for complete search history.

(56) References Cited

U.S. PATENT DOCUMENTS

| | | | | |
|---|---|---|---|---|
| 9,917,852 | B1* | 3/2018 | Xu | H04L 63/0236 |
| 2015/0074579 | A1* | 3/2015 | Gladstone | H04L 63/1425 715/771 |
| 2017/0006054 | A1* | 1/2017 | Stiansen | H04L 63/1425 |
| 2017/0026391 | A1* | 1/2017 | Abu-Nimeh | G06F 21/552 |
| 2017/0163603 | A1* | 6/2017 | Xu | H04L 63/1416 |
| 2017/0251003 | A1* | 8/2017 | Rostami-Hesarsorkh | H04L 63/1425 |

(Continued)

OTHER PUBLICATIONS

'developer.chrome.com' [online] "Chrome.webRequest," Available on or before Mar. 2, 2014 via the Wayback Machine [retrieved on Oct. 1, 2018] Retrieved from Internet: URL<https://developer.chrome.com/extensions/webRequest> 23 pages.

(Continued)

*Primary Examiner* — Dangelino N Gortayo
(74) *Attorney, Agent, or Firm* — Fish & Richardson P.C.

(57) ABSTRACT

In some implementations, a method includes logging, by a user device, mapping data that maps domain names of Internet resources presented on the user device to Internet Protocol (IP) addresses of the Internet resources, determining, by the user device, that one or more criteria are satisfied for transmitting the mapping data to a passive Domain Name Service (DNS) system, and in response to determining that the one or more criteria are satisfied, transmitting, by the user device, the mapping data to the passive DNS system.

18 Claims, 4 Drawing Sheets

(56) References Cited

U.S. PATENT DOCUMENTS

2018/0077110 A1* 3/2018 Huston, III ............. H04L 43/18
2018/0349599 A1* 12/2018 Teller .................. H04L 63/1433
2018/0375894 A1* 12/2018 Vervier ............... H04L 61/2007

OTHER PUBLICATIONS

'Techgenix.com' [online] "What is Passive DNS," Benjamin Roussey, Jul. 8, 2017, [retrieved on Oct. 1, 2018] Retrieved from Internet: URL<http://techgenix.com/what-passive-dns/> 8 pages.
Edmonds. "ISC Passive DNS Architecture," Internet Systems Consortium, Inc., Mar. 2012, 18 pages.

* cited by examiner

PASSIVE DNS SYSTEM

CROSS-REFERENCE TO RELATED APPLICATION

This application claims priority under 35 U.S.C. § 119 to European Patent Application No. 17382431.9, filed on Jul. 4, 2017. The contents of this application is hereby incorporated by reference in its entirety.

BACKGROUND

This specification generally relates to building a passive DNS database.

Domain Name Service (DNS) systems maintain directories of domain names associated with Internet Protocol (IP) addresses. DNS systems allow a user to identify the source of various packets to support malware detection and prevention. For example, by identifying domains that map to the same malicious IP address, malware analysts can discover malicious Trojan infrastructure and block packet traffic to and from any sites within the infrastructure.

In general, building a DNS database requires network infrastructure to intercept inter-server DNS messages and forward the messages to a collection point for analysis. Additionally, it can be difficult to obtain necessary permissions from particular domains when creating the infrastructure. Collecting the domain name and IP address information passively through existing network access technology, such as web browsers, allows a system to develop a DNS database without owning infrastructure. The system is able to intercept server DNS messages in transit using web browser add-ons that provide the IP address to which a user connects upon asking for a particular domain when the user browses the Internet.

SUMMARY

In one implementation, a user device presents Internet resources to a user through a browser. During presentation of the Internet resources, an add-on of the browser logs mapping data that maps domain names of the resources to IP addresses of the resources by monitoring DNS look-ups transmitted by the browser and logging resolutions of the look-ups. The browser then determines whether certain criteria have been met before transmitting the mapping data to a passive DNS system to build a database. These criteria can include meeting a threshold amount of mapping data, receiving input from a user, or the passing of a specified period of time.

One innovative aspect of the subject matter described in this specification can be embodied in a method that includes logging, by a user device, mapping data that maps domain names of Internet resources presented on the user device to Internet Protocol (IP) addresses of the Internet resources, determining, by the user device, that one or more criteria are satisfied for transmitting the mapping data to a passive Domain Name Service (DNS) system, and in response to determining that the one or more criteria are satisfied, transmitting, by the user device, the mapping data to the passive DNS system.

Implementations may include one or more of the following features. For example, the Internet resources can be presented in a web browser installed on the user device, and wherein the logging, determining, and transmitting can be performed by an add-on of the web browser. Logging the mapping data can include monitoring DNS look-ups transmitted by the web browser and logging resolutions of the monitored DNS look-ups in the mapping data. The add-on may be a browser extension or a plug-in.

In some implementations, the method includes compiling, by the passive DNS system, mappings between domain names and IP addresses received from a plurality of user devices that includes the user device, receiving, by the passive DNS system, a query that specifies a requested IP address, and providing, in response to the query and by the passive DNS system, a response that identifies each domain name that is mapped to the requested IP address in the mappings compiled by the passive DNS system.

In some implementations, the one or more criteria include input from a user of the user device indicating a command to transmit the mapping data to the passive DNS system. In some implementations, the one or more criteria include a threshold number of mappings of domain names to IP addresses has been logged. In some implementations, the one or more criteria include logging at least one mapping of a particular IP address to a domain name. In some implementations, the one or more criteria include a threshold period of time elapsing since a most-recent mapping transmission. In some implementations, logging mapping data includes storing, in a local database, the mappings of domain names to IP addresses in batches of a predetermined size.

Another innovative aspect of the subject matter described in this specification can be embodied in a browser-based passive DNS system that includes one or more computers and one or more storage devices storing instructions that when executed by the one or more computers cause the one or more computers to perform operations. The operations can include logging, by a user device, mapping data that maps domain names of Internet resources presented on the user device to Internet Protocol (IP) addresses of the Internet resources, determining, by the user device, that one or more criteria are satisfied for transmitting the mapping data to a passive Domain Name Service (DNS) system, and in response to determining that the one or more criteria are satisfied, transmitting, by the user device, the mapping data to the passive DNS system.

In some implementations, the Internet resources are presented in a web browser installed on the user device, and the logging, determining, and transmitting are performed by an add-on of the web browser. Logging the mapping data can include monitoring DNS look-ups transmitted by the web browser and logging resolutions of the monitored DNS look-ups in the mapping data. The add-on may be a browser extension or a plug-in.

In some implementations, the operations include compiling, by the passive DNS system, mappings between domain names and IP addresses received from a plurality of user devices that includes the user device, receiving, by the passive DNS system, a query that specifies a requested IP address, and providing, in response to the query and by the passive DNS system, a response that identifies each domain name that is mapped to the requested IP address in the mappings compiled by the passive DNS system.

In some implementations, the one or more criteria include input from a user of the user device indicating a command to transmit the mapping data to the passive DNS system. In some implementations, the one or more criteria include a threshold number of mappings of domain names to IP addresses has been logged.

Another innovative aspect of the subject matter described in this specification can be embodied in one or more non-transitory computer readable media storing instructions that when executed by one or more computers cause the one or more computers to perform operations. These operations include logging, by a user device, mapping data that maps domain names of Internet resources presented on the user device to Internet Protocol (IP) addresses of the Internet resources, determining, by the user device, that one or more criteria are satisfied for transmitting the mapping data to a passive Domain Name Service (DNS) system, in response to determining that the one or more criteria are satisfied, transmitting, by the user device, the mapping data to the passive DNS system.

The subject matter described in this specification can be implemented in particular embodiments so as to realize one or more of the following advantages. Mapping data logged by a browser can be provided to a passive DNS system to build a DNS database that can resolve both DNS look-ups, in which a domain is provided and an IP address is transmitted in response, and reverse-DNS look-ups, in which an IP address is provided and a domain name is transmitted in response. Furthermore, by batching together mapping data before transmitting the data to the passive DNS system, the browser reduces overhead and latency associated with packet transmission over networks, such as the Internet.

A plug-in of the browser can be used to examine the data traffic of the browser because the plug-in is integrated with the browser. This reduces the need for specialized infrastructure in order to collect DNS data, and allows the passive DNS system to build the DNS database 146 using existing network infrastructure.

In addition to providing operating information to Internet resource administrators about their data traffic, reverse-DNS look-ups help researchers detect malware providers. Malware researchers can use the passive DNS system to link domains that provide malware and determine infrastructure of malware operations that are not visible without identifying common IP addresses and network activity.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally describes techniques for building a passive DNS database without requiring ownership of extensive infrastructure.

A browser-based passive DNS system can receive DNS data collected by a browser of a user device. The browser contains functionality that can collect data identifying DNS resolutions as a user navigates the Internet using the user device. The collected data is batched and provided to a passive DNS system based on one or more conditions being satisfied. For example, if a threshold amount of data has been collected, the browser can provide the collected data to the passive DNS system.

Figure 1:
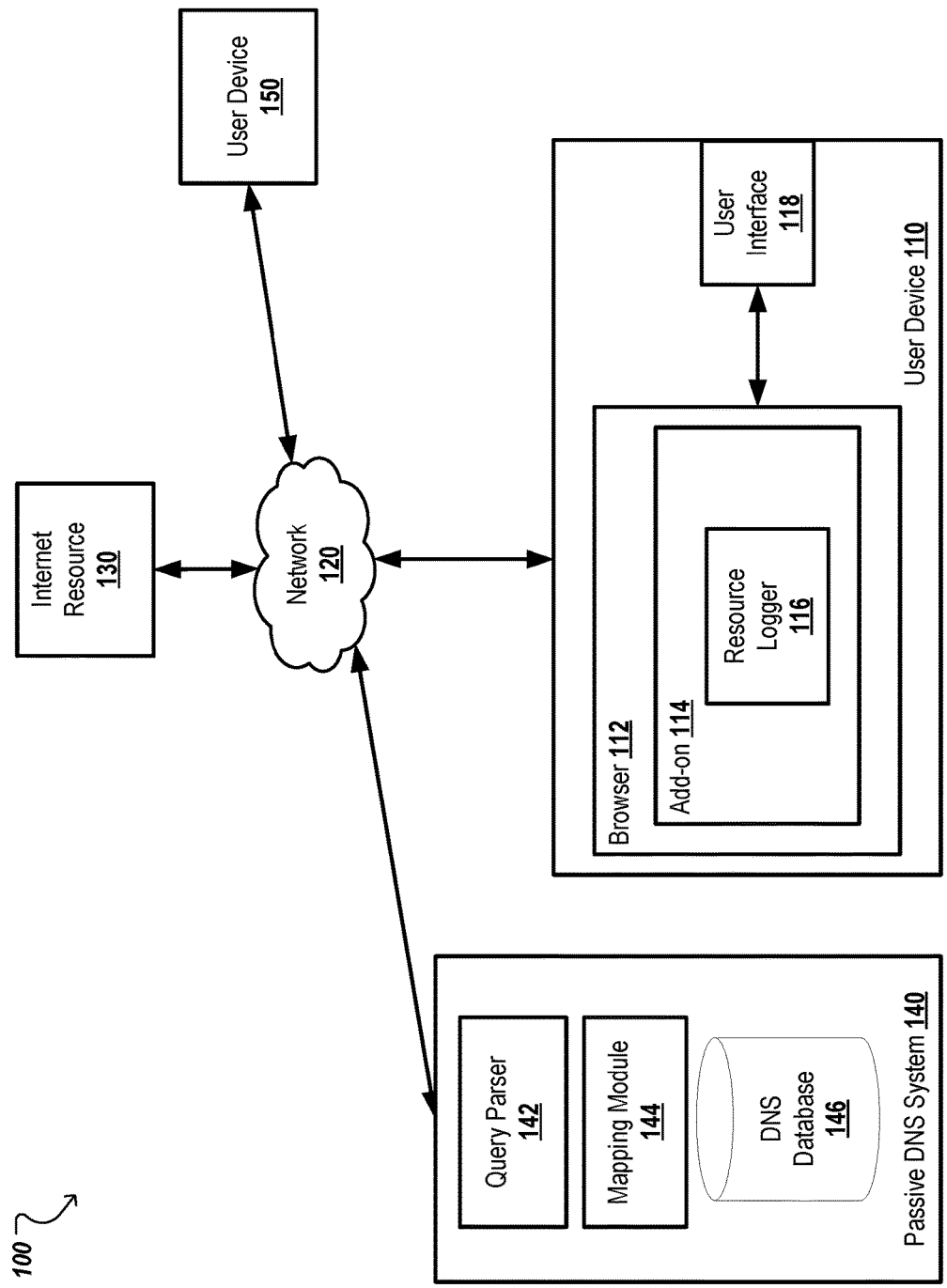
FIG. 1 is a system diagram that illustrates an example browser-based passive DNS system that intercepts and analyzes files and resources requested by a user device.

FIG. 1 is a system diagram that illustrates an example browser-based passive DNS system 100. The system 100 includes user devices 110 and 150 that are communicably connected to a network 120 and through which a user can request access to and download files and resources. The user devices 110 and 150 are connected to an Internet resource 130 through the network 120, and may send data to or receive data from the Internet resource 130. The user devices 110 and 150 are also connected to a passive DNS system 140 that analyzes data provided by the user devices 110 and 150 to build a passive DNS database. While the user device 150 can also communicate with the passive DNS system 140, only the interactions between the user device 110 and the passive DNS system 140 will be described for simplicity.

The user devices 110 and 150 may be electronic devices that are capable of requesting and receiving resources over the network 120. Example user devices 110 or 150 include personal computers, mobile communication devices, and other devices that can send and receive data over the network 120. A user device 110 or 150 typically includes a user application, such as a web browser, to facilitate the sending and receiving of data over the network 120, but native applications executed by the user device 110 or 150 can also facilitate the sending and receiving of data over the network 120.

The network 120 can be a local area network (LAN), a wide area network (WAN), the Internet, or a combination thereof. The network 120 connects the user device 110 with the malware detection system 130. The network 120 may include 802.11 "Wi-Fi" wireless Ethernet (e.g., using low-power Wi-Fi chipsets), Bluetooth, networks that operate over AC wiring, or Category 5 (CAT5) or Category 6 (CAT6) wired Ethernet network.

The user device 110 includes a web browser 112 that retrieves, displays, and transmits data and resources through a network such as the network 120. The browser 112 can display data visually through a graphical user interface (GUI) on a display of the user device 110. For example, the user device 110 can include a user interface 118 that allows a user to view and interact with the data presented by the browser 112 through the GUI.

The browser 112 includes an add-on 114. The add-on 114 is software that integrates with the browser 112 to extend the functionality of the browser 112. For example, the add-on 114 can be a plug-in or a browser extension. The add-on 114 examines data traffic to and from the user device 110 when the user device 110 communicates through the network 120 with Internet resources, such as the Internet resource 130, using the browser 112. As the user device 110 sends or receives data using the browser 112, the add-on 114 can record that data or certain characteristics of the data using a resource logger component, such as the resource logger 116.

The resource logger 116 is a module within the add-on 114 that logs resource data examined by the add-on 114. In some examples, the resource logger 116 is a module of the browser 112 itself and is separate from, but communicably connected to, the add-on 114. The resource logger 116 monitors data traffic by intercepting DNS look-ups, or requests to determine an IP address from a domain name, and logging the resolutions. For example, if a user of the user device 110 requests access to a particular Internet resource such as the Internet resource 130 using the domain name for the Internet resource, the resource logger 116 can intercept the data traffic requesting the IP address for the domain name associated with the Internet resource 130.

The user interface 118 can include physical user input components, such as a keyboard or mouse, as well as graphical user interface elements, such as a virtual keyboard, browser user interface elements including scroll bars, text boxes, etc. A user of the user device 110 can provide input to the browser 112 through the user interface 118. For example, a user can navigate to a particular web page with the browser 112, which can present the web page through a display that is part of the user interface 118 of the user device 110.

The passive DNS system 140 manages mappings between domain names and IP addresses. The passive DNS system 140 receives mapping data from various user devices through the network 120 and compiles the mappings into a database, such as the DNS database 146.

When a user device, such as the user device 110 or 150, makes a DNS request for domain names associated with a particular IP address, the DNS database 146 is accessed to determine, from the stored mappings, whether there is an existing mapping between an IP address provided in the request and network domains.

The query parser 142 parses queries made by the user devices 110 and 150 to determine the IP address being requested by the query. The query parser 142 receives queries that specify a particular IP address to be resolved to a domain name and identifies the particular IP address. The query parser 142 can provide the particular IP address to a mapping module that accesses the DNS database 146 to identify any mappings between the particular IP address and domain names.

The mapping module 144 maps domain names to IP addresses using the mapping data received by the passive DNS system 140 by generating mappings between a particular IP address and domain name. The mapping module 144 maintains the DNS database 146 by updating mappings between the particular IP address and various domain names. For example, the mapping data can indicate that a particular IP address resolves to a first domain. In such an example, the mapping module 144 can determine from a stored mapping that the particular IP address is already mapped to a second domain. The mapping module 144 can then update the stored mapping for the particular IP address to include an additional mapping between the particular IP address and the first domain.

The DNS database 146 stores the domain name and IP address mappings. The mapping module 144 can provide mappings to the DNS database 146 and can update stored mappings based on received mapping data from user devices. In some examples, user devices can transmit mapping data directly to the DNS database 146 to be stored.

Figure 2:
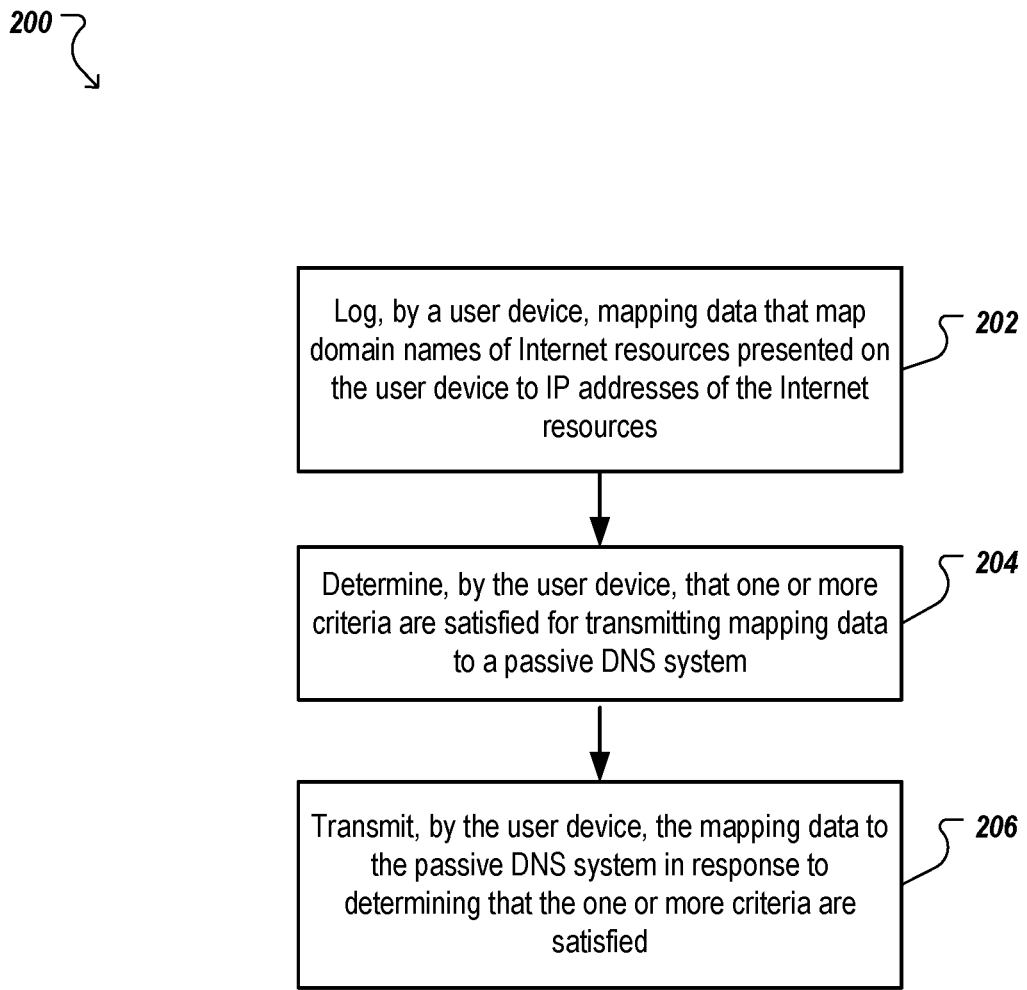
FIG. 2 is a flow diagram that illustrates an example process for transmitting data from a user device to the passive DNS system.

FIG. 2 is a flowchart of an example process 200 for providing DNS data from a browser to a passive DNS system. The process 200 may be performed by a system such as the browser-based passive DNS system 100.

A user device logs mapping data that maps domain names of Internet resources presented on the user device to Internet Protocol (IP) addresses of the Internet resources (202). For example, the user device 110 or the user device 150 can log mapping data that maps domain names to IP addresses by examining packet traffic between the user device 110 itself and various Internet resources, such as the Internet resource 130. The mapping data can be stored in local memory, such as a cache or Random Access Memory (RAM), of the user device.

The user device determines that one or more criteria are satisfied for transmitting the mapping data to a passive Domain Name Service (DNS) system (204). For example, the user device 150 can compare the number of locally stored mapping entries to a predetermined threshold number of mapping entries. If there is at least the threshold number, the user device 150 can determine that a criteria for transmitting the mapping data is satisfied. Overhead in transmission and processing each mapping entry is reduced when ensuring that at least a threshold number of mapping entries has been logged prior to transmission. Another criteria can be receiving input indicating a command to transmit the mapping data. By waiting to transmit the mapping data until the mapping data is requested, computer resources are conserved by reducing the amount of unnecessary transmission and subsequent processing required. The user device 150 can also transmit the mapping data based on determining that a threshold period of time has passed between the most recent transmission of mapping data. For example, the user device 150 can transmit mapping data at regular intervals even if another criteria for transmission has not been satisfied, such as a threshold number of mapping entries. In such an example, if two days have passed since the last time the user device 150 transmitted mapping data to the passive DNS system 140, the user device 150 can transmit the mapping entries stored in local memory so far.

The user device transmits the mapping data to the passive DNS system in response to determining that the one or more criteria are satisfied (206). For example, once the user device 150 has determine that one or more of the criteria have been satisfied, the user device 150 can provide the mapping data to the passive DNS system 140 through the network 120.

Figure 3:
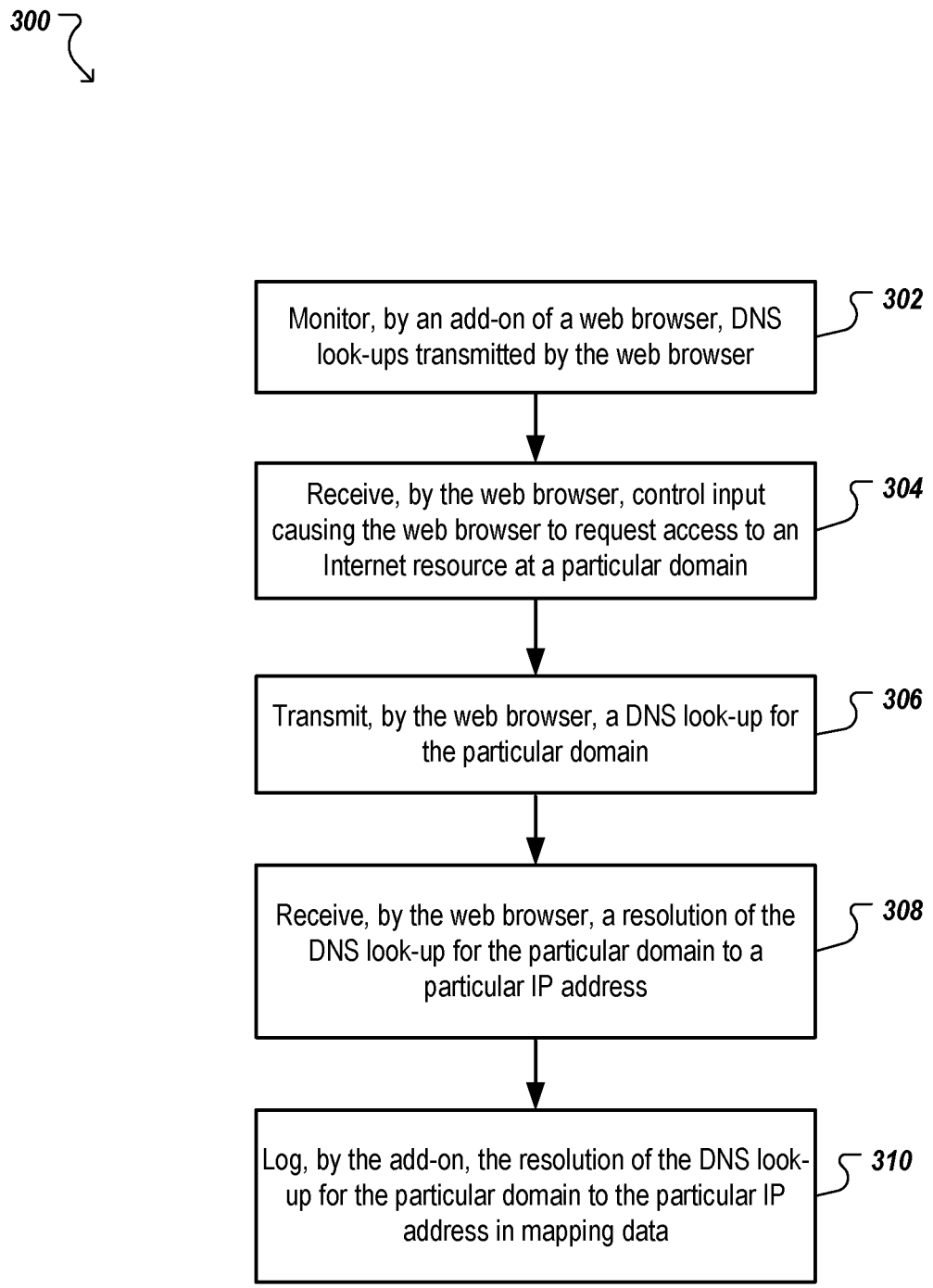
FIG. 3 is a flow diagram that illustrates an example process for collecting DNS data through a browser of a user device.

FIG. 3 is a flowchart of an example process 300 for collecting DNS data. The process 300 may be performed by a browser of a user device. For example, the process 300 can be performed by the browser 112 of the user device 110.

When a user is browsing the Internet and requests access to an Internet resource, such as the Internet resource 130, the user generally knows the domain name, such as www.this-is-an-example-domain-name-for-the-resource.com, but does not know the various IP addresses associated with the domain name. Therefore, when a user requests access to the Internet resource 130, the user generally provides the domain name through a browser and the browser transmits a DNS look-up to determine an IP address at which the Internet resource 130 associated with the domain name provided by the user is located.

A plug-in of a web browser monitors DNS look-ups transmitted by the web browser (302). The browser 112 may include an add-on 114 that provides an additional functionality to the browser 112. In this example, the add-on 114 allows the browser 112 to monitor DNS look-ups transmitted by the browser 112 in order to collect mapping data used to map domain names of Internet resources, such as the Internet resource 130, accessed by the browser 112, to IP addresses that the Internet resource 130 resolves to. In some implementations, the add-on 114 is a browser extension.

The web browser receives control input causing the web browser to request access to an Internet resource at a particular domain (304). For example, the browser 112 can receive input from a user of the user device 110 through the user interface 118 requesting access to the Internet resource 130. In such an example, the Internet resource can be a fashion web site hosted by a particular domain.

The web browser transmits a DNS look-up for the particular domain (306). Users generally do not know the IP addresses of the resources they wish to access, as the domain names provide an easier way to access the same resources. In order to access the Internet resource 130, the browser 112 can transmit a DNS look-up to find an IP address to which the domain provided by the user resolves. Because the add-on 114 is monitoring DNS look-ups transmitted by the browser 112, the add-on 114 can detect that the look-up has been transmitted and can expect to log a resolution.

The web browser receives a resolution of the DNS look-up for the particular domain to a particular IP address (308). The browser 112 can transmit the DNS look-up to a DNS system, such as the passive DNS system 114 or another remote DNS system. The browser 112 can receive a resolution of the DNS look-up for the particular domain to a particular IP address. For example, the browser 112 can receive data indicating the particular IP address at which the Internet resource 130 can be accessed.

The plug-in logs the resolution of the DNS look-up for the particular IP address to the particular domain in mapping data (310). The add-on 114 examines the resolution received by the browser 112 and can log the data received that indicates that the particular domain resolves to the particular IP address using the resource logger 116. The resource logger 116 can store data in a memory of the browser 112 or the user device 110, such as a cache. In some examples, the resource logger 116 has a separate memory to which the mapping data is logged.

The mapping data logged by the add-on 114 can be provided to the passive DNS system 140 according to the process 200 as described above with respect to FIG. 2. Using the mapping data from DNS look-ups transmitted by the browser 112 and subsequently resolved to a particular IP address, the passive DNS system 140 can build the DNS database 146 and resolve reverse-DNS look-ups in which a particular IP address is provided and the associated domain or domains are provided. For example, if a different user device, such as the user device 150 transmits a reverse-DNS look-up query indicating a particular IP address to the passive DNS system 140, the passive DNS system 140 can use the DNS database 146 built using DNS look-up data to resolve the particular IP address to a particular domain.

Additionally, because the add-on 114 is integrated with the browser 112, the add-on 114 is able to access data traffic of the browser 112 and eliminates the need for specialized infrastructure in order to collect DNS data for the browser 112. Thus, the passive DNS system 140 is able to build the DNS database 146 using existing network infrastructure.

Figure 4:
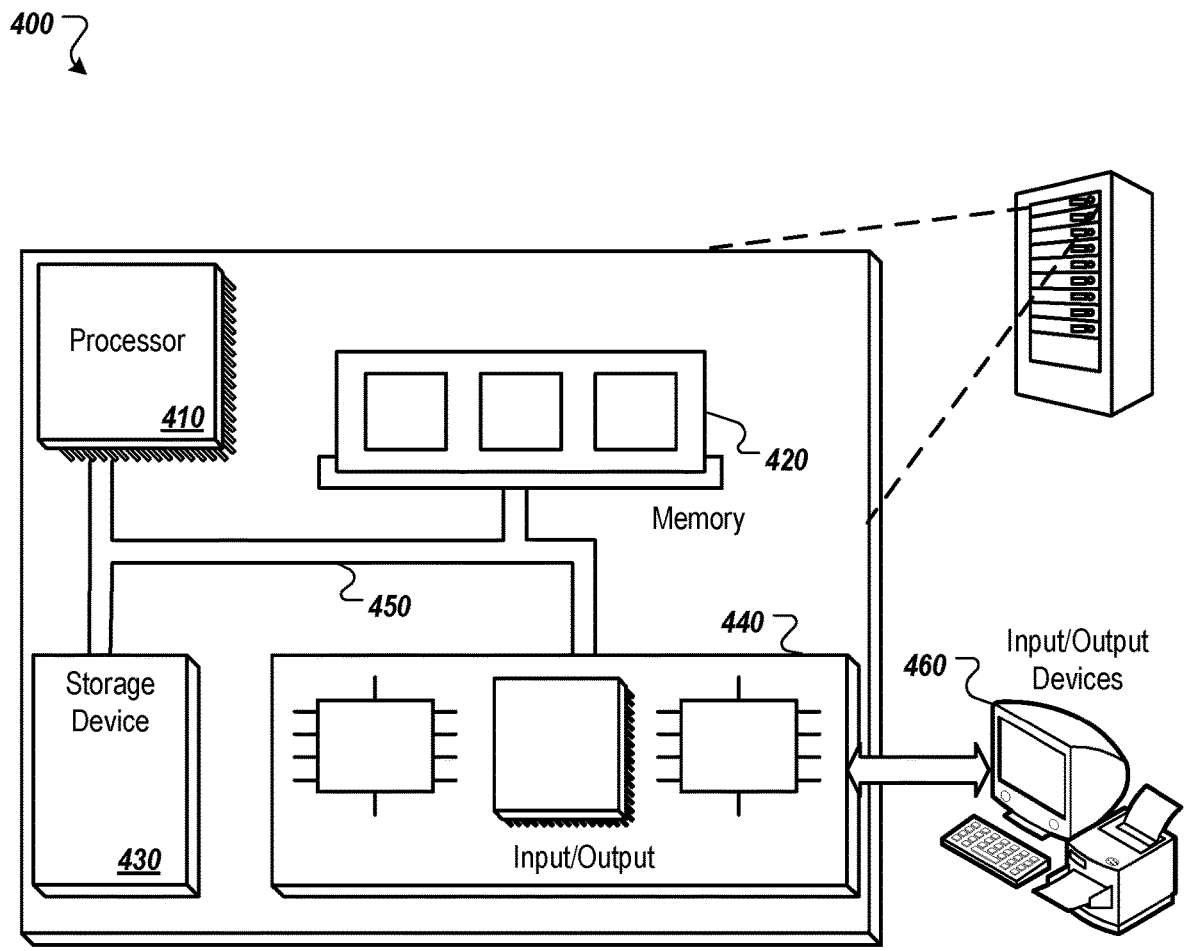
FIG. 4 is a block diagram of an example computing system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing units (e.g., a cloud storage device), or some other large capacity storage device.

The input/output device 440 provides input/output operations for the system 400. In one implementation, the input/output device 440 can include one or more network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 460. Other implementations, however, can also be used, such as mobile computing units, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    requesting, by an application on a user device and based on a user input specifying a domain name of a host, Internet resources through a network, each request in response to respective user input specifying a respective domain name of a respective host hosting a respective Internet resource;
    receiving through the network and presenting on the user device, in response to the requests, the Internet resources;
    logging, by the user device, mapping data that maps domain names of the Internet resources presented on the user device to Internet Protocol (IP) addresses of the Internet resources, each Internet Protocol (IP) addresses provided in response to a respective user input specifying a respective domain name, the logging including:
        monitoring DNS look-ups transmitted by the application on the user device in response to the user inputs specifying respective domain name; and
        logging resolutions of the monitored DNS look-ups in the mapping data;
    determining, by the user device, that one or more criteria are satisfied for transmitting the mapping data to a passive Domain Name Service (DNS) system, wherein the one or more criteria are set such that multiple mapping entries are logged before each transmission so that each transmission results in a transmission of multiple mapping entries; and
    in response to determining that the one or more criteria are satisfied, transmitting, by the user device, the mapping data to the passive DNS system.

2. The method of claim 1, wherein the Internet resources are presented in a web browser installed on the user device, and wherein the logging, determining, and transmitting are performed by an add-on of the web browser.

3. The method of claim 2, wherein the add-on is a browser extension.

4. The method of claim 2, wherein the add-on is a plug-in.

5. The method of claim 1, further comprising:
    compiling, by the passive DNS system, mappings between domain names and IP addresses received from a plurality of user devices that includes the user device;
    receiving, by the passive DNS system, a query that specifies a requested IP address; and
    providing, in response to the query and by the passive DNS system, a response that identifies each domain name that is mapped to the requested IP address in the mappings compiled by the passive DNS system.

6. The method of claim 1, the one or more criteria comprising input from a user of the user device indicating a command to transmit the mapping data to the passive DNS system.

7. The method of claim 1, the one or more criteria comprising a threshold number of mappings of domain names to IP addresses has been logged.

8. The method of claim 1, the one or more criteria comprising logging at least one mapping of a particular IP address to a domain name.

9. The method of claim 1, the one or more criteria comprising a threshold period of time elapsing since a most-recent mapping transmission.

10. The method of claim 1, wherein logging mapping data comprises storing, in a local database, the mappings of domain names to IP addresses in batches of a predetermined size.

11. A browser-based passive DNS system comprising:
    one or more computers; and
    one or more storage devices storing instructions that when executed by the one or more computers cause the one or more computers to perform operations comprising:
        requesting, by an application on a user device and based on a user input specifying a domain name of a host, Internet resources through a network, each request in response to respective user input specifying a respective domain name of a respective host hosting a respective Internet resource;
        receiving through the network and presenting on the user device, in response to the requests, the Internet resources;
        logging, by the user device, mapping data that maps domain names of the Internet resources presented on the user device to Internet Protocol (IP) addresses of the Internet resources, each Internet Protocol (IP) addresses provided in response to a respective user input specifying a respective domain name, the logging including:
            monitoring DNS look-ups transmitted by the application on the user device in response to the user inputs specifying respective domain name; and
            logging resolutions of the monitored DNS look-ups in the mapping data;
        determining, by the user device, that one or more criteria are satisfied for transmitting the mapping data to a passive Domain Name Service (DNS) system, wherein the one or more criteria are set such that multiple mapping entries are logged before each transmission so that each transmission results in a transmission of multiple mapping entries; and
        in response to determining that the one or more criteria are satisfied, transmitting, by the user device, the mapping data to the passive DNS system.

12. The system of claim 11, wherein the Internet resources are presented in a web browser installed on the user device, and wherein the logging, determining, and transmitting are performed by an add-on of the web browser.

13. The system of claim 12, wherein the add-on is a browser extension.

14. The system of claim 12, wherein the add-on is a plug-in.

15. The system of claim 11, the operations further comprising:
    compiling, by the passive DNS system, mappings between domain names and IP addresses received from a plurality of user devices that includes the user device;
    receiving, by the passive DNS system, a query that specifies a requested IP address; and
    providing, in response to the query and by the passive DNS system, a response that identifies each domain name that is mapped to the requested IP address in the mappings compiled by the passive DNS system.

16. The system of claim 11, the one or more criteria comprising input from a user of the user device indicating a command to transmit the mapping data to the passive DNS system.

17. The system of claim 11, the one or more criteria comprising a threshold number of mappings of domain names to IP addresses has been logged.

18. One or more non-transitory computer readable media storing instructions that when executed by one or more computers cause the one or more computers to perform operations comprising:
  requesting, by an application on a user device and based on a user input specifying a domain name of a host, Internet resources through a network, each request in response to respective user input specifying a respective domain name of a respective host hosting a respective Internet resource;
  receiving through the network and presenting on the user device, in response to the requests, the Internet resources;
  logging, by the user device, mapping data that maps domain names of the Internet resources presented on the user device to Internet Protocol (IP) addresses of the Internet resources, each Internet Protocol (IP) addresses provided in response to a respective user input specifying a respective domain name, the logging including:
    monitoring DNS look-ups transmitted by the application on the user device in response to the user inputs specifying respective domain name; and
    logging resolutions of the monitored DNS look-ups in the mapping data;
  determining, by the user device, that one or more criteria are satisfied for transmitting the mapping data to a passive Domain Name Service (DNS) system, wherein the one or more criteria are set such that multiple mapping entries are logged before each transmission so that each transmission results in a transmission of multiple mapping entries; and
  in response to determining that the one or more criteria are satisfied, transmitting, by the user device, the mapping data to the passive DNS system.

* * * * *